July 18, 1944.  C. R. PATON  2,354,139
DRIVE MECHANISM
Filed Dec. 19, 1941
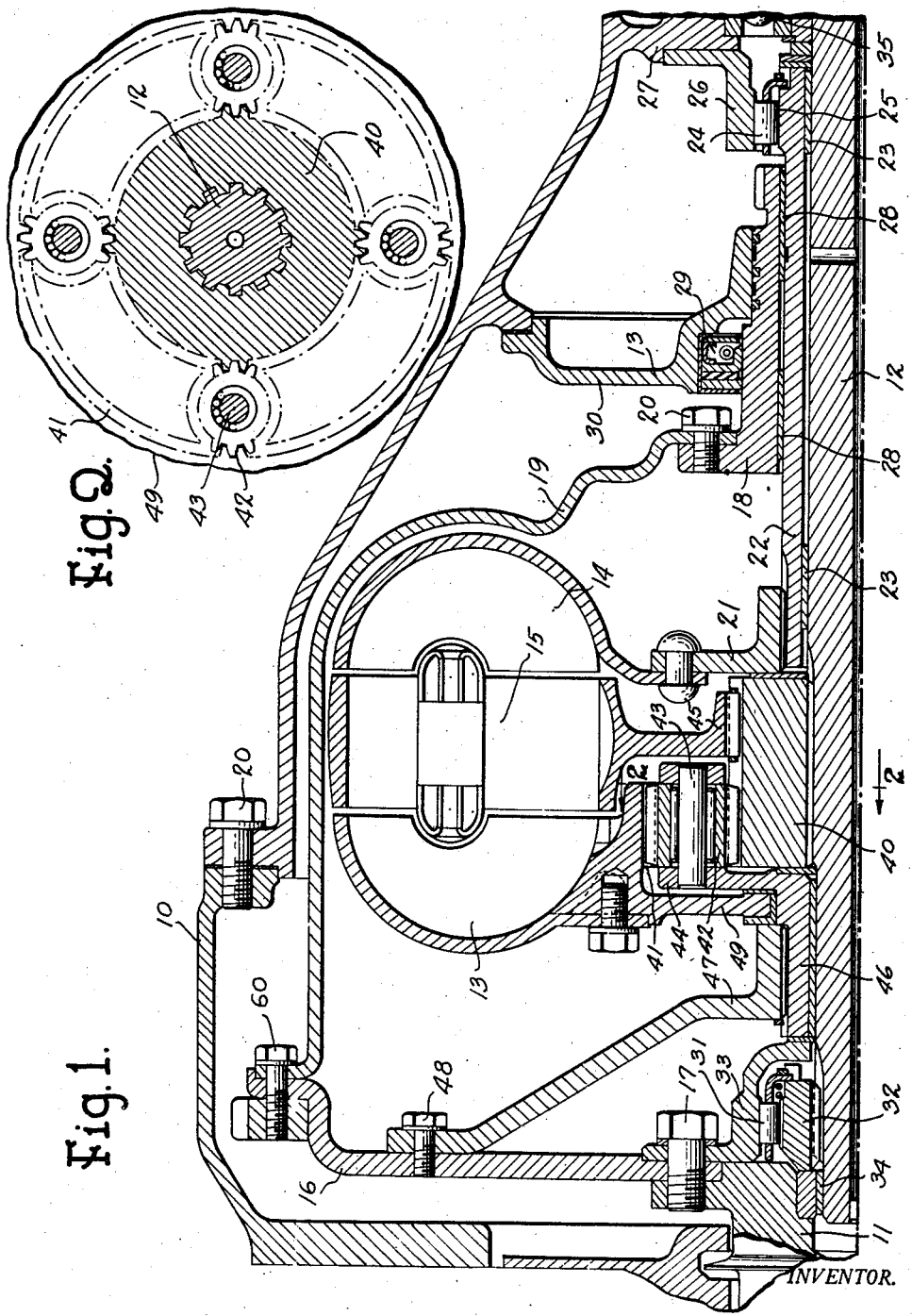
INVENTOR.
CLYDE R. PATON
BY
*Tibbetts & Hart*
Attorneys Patented July 18, 1944

2,354,139

UNITED STATES PATENT OFFICE 2,354,139

DRIVE MECHANISM

Clyde R. Paton, Birmingham, Mich., assignor to Packard Motor Car Company, Detroit, Mich., a corporation of Michigan Application December 19, 1941, Serial No. 423,654

4 Claims. (Cl. 74—189.5)

This invention relates to transmissions and more particularly to transmissions employing hydraulic torque converters.

An object of the invention is to provide a transmission for motor vehicles in which a hydraulic torque converter of relatively small overall dimensions can be employed.

Another object of the invention is to provide a hydraulic torque converter type of transmission that can be conveniently carried beneath a motor vehicle body without material projection into the body space or allowance for road clearance beyond that considered essential for transmissions that do not include a hydraulic torque converter.

A further object of the invention is to provide a transmission in which planetary gearing is employed to transfer power from a driving member to a driven member in two paths.

Other objects of the invention will appear from the following description taken in connection with the drawing, which forms a part of this specification, in which:

Fig. 1 is a fragmentary vertical sectional view of a transmission having the invention incorporated therein;

Fig. 2 is a sectional view of the driving couple taken on line 2—2 of Fig. 1.

The housing for the transmission is indicated by numeral 10 and a driving shaft 11, which can be an engine crankshaft, projects into the housing. A driven shaft 12 also projects into the housing and is arranged to align axially with the driving shaft. Between the shafts and within the housing is a torque converter having an impeller 13, a stator 14 and a driven member 15. A casing surrounding the torque converter provides driving means coupling the driving shaft and the impeller and includes flywheel 16 fixed to the driving shaft by bolts 17, ring member 19 fixed to the flywheel by bolts 60 and sleeve 18 fixed to the ring member by bolts 20.

The stator is riveted to hub 21 splined on a reactor sleeve 22 mounted on suitable bearings 23 on the driven shaft. One-way overrunning rollers 24 are arranged between cam surfaces 25 on the end of sleeve 22 and a drum 26 fixed to internal housing wall 27 to brake the stator when it attempts to rotate in reverse direction. Sleeve 18 encircles a portion of sleeve 22 and suitable bearings 28 are arranged therebetween. An oil seal 29 is arranged between sleeve 18 and an internal wall 30 of the housing.

In order that the driving shaft can be rotated when the driven shaft becomes the driver, such as when a motor vehicle is being pushed for starting, one-way overrunning clutch rollers 31 are arranged between the adjacent ends of the driving shaft and the driven shaft. These rollers engage cam surfaces on hub 32 splined to the driven shaft and drum member 33 fixed to the driving shaft. The driven shaft is carried by a bearing 34 in the rear end of the driving shaft and by a bearing 35 in wall 27.

The drive from the driving shaft to the driven shaft flows in two paths, one path of flow passing through the torque converter and the other path of flow passing direct. This divided power flow is provided through planetary gearing coupling means consisting of a sun gear 40 splined on the driven shaft, a ring gear 41 formed on the impeller, planet gears 42 mounted on pins 43 fixed to carrier 44. The driven member of the torque converter has a hub 45 splined on the sun gear and the carrier has a sleeve extension 46 on which a driving ring 47 is splined. The driving ring can be fixed to the flywheel by bolts 48.

The impeller has a bearing flange 49 suitable to rotate on the carrier sleeve and is located forward of the stator, the driven member of the torque converter being intermediate the impeller and the stator. The torque converter structure can be formed with blades cooperating in a conventional manner upon fluid in the casing.

When the vehicle to which the transmission is to be applied is standing still and the engine connected with the driving shaft 11 is idling, carrier 44 will be driven and will cause planet gears 42 to rotate around gear 40 which is held stationary with driven shaft 12 due to vehicle friction. This rotation of planet gears 42 around gear 40 will drive the impeller 13 at an increased speed from the driving shaft 11 and such rotation of the impeller will circulate fluid in the torque converter which tends to rotate the stator 14 in a reverse direction to the impeller 13 but the stator is held stationary under such conditions by the one-way brake 24, 25 and 26. When the engine is idling and the vehicle is stationary, the fluid pressure developed in the torque converter is not sufficient to overcome the friction of the car so there will be no forward motion of the vehicle. To overcome such vehicle friction and get the vehicle under way it is necessary to increase the speed of the engine in order to overcome the vehicle friction sufficiently to allow rotation of shaft 12 and sun gear 40.

When the vehicle is under way, power from the driving shaft passes through ring 41 to the planetary gearing carrier where it is divided and passes through the planet gears to the sun gear and to the ring gear. The sun gear will be driven by the planet gears and a part of the power will thus pass directly to the driven shaft and will be shunted past the torque converter. At the same time the ring gear and impeller will be driven by the planet gears and will transmit power through the converter to the driven member. The stator or reaction member will be locked from reverse rotation by brake 24 and the fluid power in the converter will pass to the driven member from which it flows to the sun gear and driven shaft.

By dividing the power flow so that the driven shaft is directly rotated by the driving shaft after the vehicle is under way, the entire power does not have to pass through the converter and consequently the overall size of the converter can be considerably reduced.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a transmission, a driving shaft, a driven shaft, a torque converter having an impeller, a stator, and a driven member between the impeller and the stator, a sleeve extension on the stator mounted on the driven shaft, a sun gear fixed on the driven shaft interiorly of the impeller and the driven member, said driven member being splined on the sun gear, a ring gear on an interior portion of the impeller, planet gears meshing with the ring gear and the sun gear, a carrier for the planet gears having a sleeve projecting beyond the impeller and rotatably mounted on the driven shaft, and a driving connection from the driving shaft to the carrier sleeve.

2. In a transmission, a driving shaft; a driven shaft; a torque converter having an impeller with a bearing flange at one end, a stator, and a driven member between the impeller and the stator, said stator having a sleeve extension rotatably mounted on the driven shaft; planetary gearing having a ring gear formed on the impeller between the flange bearing and the driven member, a sun gear fixed on the driven shaft interiorly of the ring gear and on which the driven member is splined, planet gears meshing with the ring gear and the sun gear and a planet gear carrier between the bearing flange and the driven member, said carrier having a sleeve extension rotatably mounted on the driven shaft and on which the bearing flange of the impeller is rotatably mounted; and means connecting the carrier sleeve to rotate with the driving shaft.

3. In a transmission, a driving shaft; a driven shaft; a torque converter having an impeller with a bearing flange at one end, a stator, and a driven member between the impeller and the stator, said stator having a sleeve extension rotatably mounted on the driven shaft; planetary gearing having a ring gear formed on the impeller between the flange bearing and the driven member, a sun gear fixed on the driven shaft interiorly of the ring gear and on which the driven member is splined, planet gears meshing with the ring gear and the sun gear and a planet gear carrier between the bearing flange and the driven member, said carrier having a sleeve extension rotatably mounted on the driven shaft and on which the bearing flange of the impeller is rotatably mounted; a casing surrounding the torque converter fixed to the driving shaft at one end and having a bearing on the rotor sleeve extension at the other end; and a drive connection from the casing to the carrier sleeve.

4. A transmission comprising a driving shaft, a driven shaft, a hydraulic torque converter having an impeller, a stator, and a driven member between the impeller and the stator, a sun gear between the impeller and the stator, said sun gear being fixed in positive driving relation on the driven shaft, means fixing the driven member in positive driving relation with the sun gear, a planetary gear carrier fixed to rotate with the driving shaft, an internal ring gear on the impeller, planet gears mounted on the carrier and meshing with the sun gear and the ring gear, and a brake operative to prevent rotation of the stator in one direction.

CLYDE R. PATON.